United States Patent [15] 3,654,393

Schenkel [45] Apr. 4, 1972

[54] DATA TRANSMISSION SYSTEM

[72] Inventor: Dieter Schenkel, Ay/Iller, Germany

[73] Assignee: Licentia Patent-Verwaltungs-G.m.b.H., Frankfurt, Germany

[22] Filed: Feb. 26, 1970

[21] Appl. No.: 14,332

[30] Foreign Application Priority Data

Feb. 27, 1969 Germany ......................P 19 09 906.0

[52] U.S. Cl. ..........................................................179/15 A
[51] Int. Cl. ...........................................................H04j 3/00
[58] Field of Search ................340/413; 235/156; 179/15 A, 179/15 AN, 15 BW

[56] References Cited

UNITED STATES PATENTS

| | | | |
|---|---|---|---|
| 2,936,338 | 5/1960 | James et al. | 179/15 AN |
| 2,579,071 | 12/1951 | Hansell | 179/15 AN |
| 2,725,470 | 11/1955 | Houghton | 179/15 AN |
| 2,380,982 | 8/1945 | Mitchell | 179/15 A |
| 2,910,682 | 10/1959 | Leonard | 340/413 |

OTHER PUBLICATIONS

Transmission Systems for Communications, Bell Telephone Laboratories, Vol. II pp. 26– 1 to 26– 23 Copyright 1959.
Transmission Systems for Communications, 4th Edition, Bell Telephone Laboratories, pp. 566– 570 Published February 1970

*Primary Examiner*—Kathleen H. Claffy
*Assistant Examiner*—David L. Stewart
*Attorney*—Spencer & Kaye

[57] ABSTRACT

A data transmission system between two parties or locations wherein switches are provided for each of the locations which are cyclically closed for short periods of time to provide for the galvanic connection between the locations. The data, which is scanned with respect to its amplitude without prior filtering, i.e., over its full bandwidth, and then transmitted in time multiplex, is generated with a fundamental frequency band width which is greater than one-half the scanning frequency. The transmitted scanned data is filtered by means of a band pass filter to suppress periodically occurring regions which contain the distortions resulting from the grouping of the fundamental bands about the multiples of the scanning frequency.

15 Claims, 8 Drawing Figures

Inventor:
Dieter Schenkel
BY Spencer & Kaye
ATTORNEYS.

Inventor:
Dieter Schenkel
BY Spencer & Kaye
ATTORNEYS.

DATA TRANSMISSION SYSTEM

BACKGROUND OF THE INVENTION

The present invention relates to a data transmission system between two of a plurality of locations or parties in which the data is scanned with respect to its amplitude at a scanning frequency $f_p$ and in which the scanned values are transmitted in time multiplex. Switches are provided in the system for each of the locations which are cyclically closed for short periods of time in order to galvanically connect the parties.

Data transmission systems operating in this manner are old and well known in the art, e.g., the public telephone system. Usually they are constructed in the manner schematically indicated in FIG. 1. In such a system each party or location TL is connected to an associated filter, generally a low pass filter TP, and the connection of the party to the multiplex rail or transmission means R is accomplished by means of respective switches Sch and coils Sp. The connection between two parties is accomplished by the synchronous actuation of the appropriate switches Sch by a switching control mechanism in a manner well known. Such a system including the control mechanism for the switches to provide the scanning and the multiplexing is described, e.g., in the paper "Outlines of a t.d.m. Two-Wire Telephone Switching System and Its Control" by H. H. Adelaar, F. A. Clemens and J. Masure (Proc. IEE, Vol. 107 (1960), Part B, Suppl. 20, 94–103).

At the transmitting end of the connection between two parties, the filters TP limit the data coming from the party, generally the voice spectrum, in such a manner that its bandwidth is less or at most equal to one-half of the scanning frequency $f_p$. The scanning frequency $f_p$ is realized by the appropriate frequent opening and closing of the respective switches Sch. This limitation on the bandwidth of the data to be scanned is necessary, as will be explained in detail below, in order to exclude distortions in the transmitted data which will render it imcomprehensible at the receiving end. At the receiving location or party the associated filter TP has the effect that only a portion of limited bandwidth of the periodic spectrum produced by the scanning is evaluated, so that a demodulation effect is produced.

The filters TP usually employed in such systems are passive filters. Such passive filters, however, exhibit such a transient behavior that a separate filter must be permanently associated with each party $TL_1$–$TL_n$. The described central office system thus requires as many filters as there are subscribers or parties resulting in the technical and economic expenditures being very great.

SUMMARY OF THE INVENTION

It is accordingly the primary object of the present invention to improve the known systems by reducing the number of filters required.

This object is attained according to the present invention in that the data is generated as fundamental frequency bands in signal sources of a limited bandwidth which is greater than $f_p/2$, (i.e., one-half of the scanning frequency) the data is then scanned over its entire bandwidth, and the periodically occurring regions in the scanned transmitted data containing distortions resulting from the grouping of the fundamental frequency bands around the multiples of the scanning frequency are suppressed by filters which are preferably active filters.

Since it is the scanned transmitted data which is being filtered, the number of filters required may be reduced to a number representing the maximum number of locations which will ordinarily be communicating at any single instant of time as learned from experience with such systems, but in any case less than the total number of locations.

DESCRIPTION OF THE PREFERRED EMBODIMENT

Figure 1:
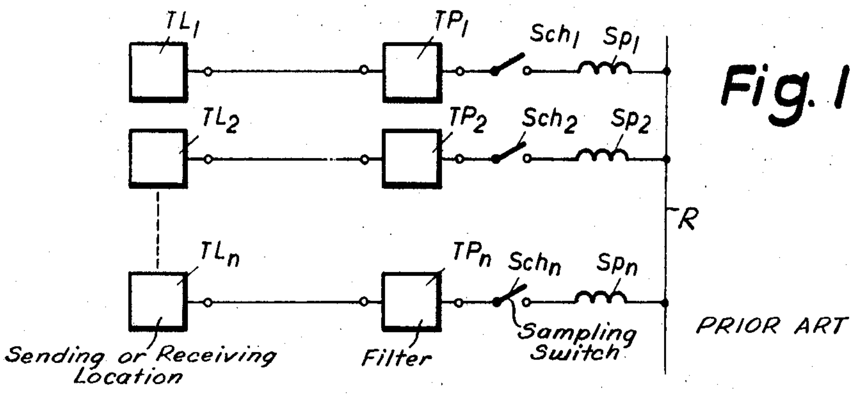
FIG. 1 is a schematic representation of a system of the type with which this invention is concerned according to the prior art.
Figures 2A, 2B, 2C, 2D:
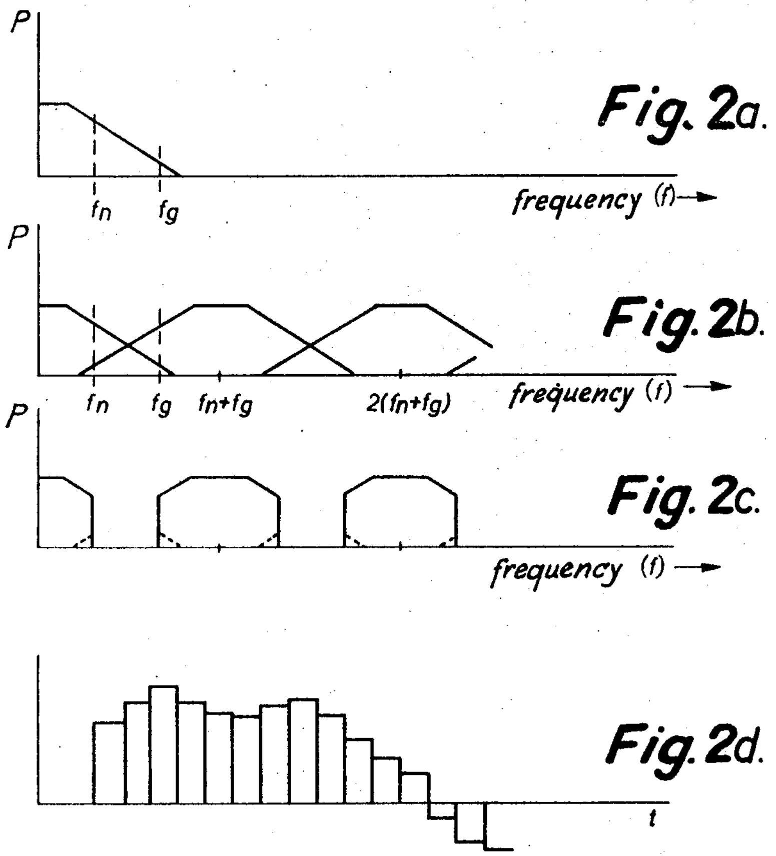
FIG. 2a–2d illustrate schematically the waveforms of the data at various locations in the data transmission system according to the invention.

Referring now to the remaining Figures, FIG. 2a shows a rough simplification of the spectral distribution of the power density P of the human voice. As indicated this density is not constant but decreases continuously above approximately 500 Hz. For example, at 12 KHz it is approximately 35 db less than at 3 KHz.

In order to explain the filtering required according to the invention, two frequencies $f_n$ and $f_g$ will be defined, $f_n$ being that frequency below which there is the data range which is to be transmitted without distortion, and $f_g$ being the frequency at which the power density of the data is negligibly small with respect to the power density of the portion of the data which is to be transmitted substantially without distortions.

If the generated data, i.e., the voice signals, is now scanned without prior filtering, i.e., over its full bandwidth with a scanning frequency $f_p$ equal, for example, to 16 KHz, which is less than twice the bandwidth of the fundamental band of the generated data, there will be practically no distortions in the range from 0 to 4 KHz. In the frequency range thereabove distortions result from the fact that the fundamental frequency band is reflected at each of the whole-number multiples of the scanning frequency resulting in the power distribution shown in FIG. 2b.

The appearance of these distortions occurring because of reflections of the fundamental frequency band of the generated data at the whole-number multiples of the scanning frequency is also the reason for the above-described limitation of the bandwidth to be transmitted in the conventional systems to one half the scanning frequency.

The present invention is based on the fact that due to the particular spectral characteristic of the human voice as indicated in FIG. 2a, this limitation on the bandwidth of the data to be transmitted relative to the scanning frequency is not necessary before scanning since, as shown in FIG. 2b, the distortions remain negligibly small in the interesting range below frequency $f_n$, the only distortions in this range being caused by the frequencies above $f_g$ which is selected as defined to be a frequency above which the power density is negligible with respect to the power density of the frequencies above $f_n$.

According to the invention therefore the data is generated with a bandwidth greater than one-half of the scanning frequency and is scanned without prior filtering, i.e., over its full bandwidth.

The heavier distortions are filtered out of the ranges above $f_n$ by filters after scanning so that an image results as shown in FIG. 2c. That is, as illustrated, the scanned data is filtered to suppress the periodically occurring frequency regions which contain distortions resulting from the overlapping of sidebands grouped about the multiples of the scanning frequency with adjacent sidebands or with the fundamental frequency band and limit the frequency bands to a wanted bandwidth. Generally, in order to meet the above requirements, it is necessary that the scanning frequency $f_p$ have the following relationship:

$$f_p = f_n + f_g$$

The present invention is further based on the fact that only a slight percentage of all parties or locations will be exchanging data with one another at any one time. For example, experience with the public telephone system has shown that the degree of utilization is approximately 10 percent at any given time. Accordingly, in a system according to the invention, the number of filters required could be reduced to this value and still provide a practically operating system.

From the described conditions there results an advantageous embodiment of the system according to the present invention which will be explained with the aid of FIG. 3.

The present system is assumed to have $k$ time slots so that $k$ of the total of $n$ parties or locations $TL_1$–$TL_n$ can be switched through or connected at any one time. Thus $k$ filters $BP_1$–$BP_k$ are required.

Each of the locations $TL_1$–$TL_n$ is connected to the transmission means R via a respective terminating set $G_1$–$G_n$, respective pairs of switches $a_{11}$–$a_{12}$, $a_{21}$–$a_{22}$,...$a_{n1}a_{n2}$ and respective Interpolators $I_1$–$I_n$ for reconstructing the data from the sampled pulses. Each of the filters $BP_1$–$BP_k$ is provided with a respective pair of switches $b_{11}$–$b_{12}$, $b_{21}$–$b_{22}$...$b_{k1}$–$b_{k2}$ by which it can be connected into the connecting line or transmission means R.

If an exchange of information is to take place between two parties, e.g., party $TL_1$ and party $TL_n$, the respective switches associated with each party, in this case switches $a_{11}$, and $a_{n2}$ are closed during the occupied time slot and simultaneously and in synchronism therewith, a pair of switches associated with one of the filters, e.g., switches $b_{11}$and $b_{12}$ is also closed to connect one of the filters, e.g., $BP_1$, into the transmission means R. During the period that the switches $a_{11}$, $b_{11}$, $b_{12}$, $a_{n2}$ are closed, all other switches are open.

The periodic closing of the switches $a_{11}$, $b_{11}$, $b_{12}$, and $a_{n1}$ not only periodically galvanically connects the parties $TL_1$ and $TL_n$ together but, moreover results in the amplitude of the data being generated by party $TL_1$ being periodically scanned over its entire bandwidth. The scanned data is applied to the input of the filter $BP_1$ where it is filtered to suppress the portions thereof containing the unwanted distortions. The output signal from the filter $BP_1$, which exhibits a pulse shape of limited bandwidth, is transmitted to party $TL_n$ via switch $b_{12}$, interpolator $I_n$, which will be discussed below, and the terminating network $G_n$. The reverse connection from party $TL_n$ to party $TL_1$ is effected during a different time slot by closing switches $a_{n1}$, $b_{21}$, $b_{22}$, and $a_{12}$ using filter $BP_2$.

As previously mentioned, passive filters exhibit an undesirable transient behavior. According to a preferred embodiment of the present invention therefore, instead of the passive type filters previously used, active type filters are employed, i.e., either sampled data filters or digital filters. Such filters are per se well known in the art.

Figure 4A:
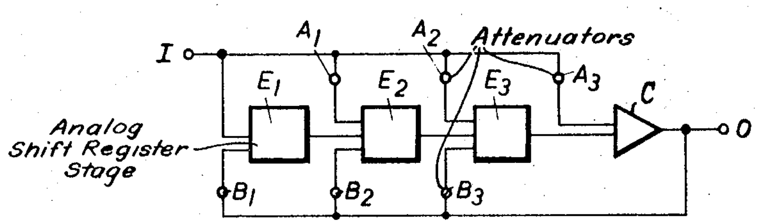
FIGS. 4a, b are schematic representations of types of filters to be used in a system according to the invention.

Referring now to FIG. 4*a*, there is schematically illustrated a sampled data filter of the third order of the type suitable for use in the system, which filter consists essentially of a feedback-connected analog shift register. The individual elements or stages $E_1$, $E_2$, $E_3$ of the shift register are constructed in a known manner, for example, as capacitor chains having delay times between their inputs and outputs of a desired magnitude. The output O of the filter is derived from a summing amplifier C connected to the output of the stage $E_3$. The input signal applied to the input terminal I is directly coupled to the first stage $E_1$, and to the remaining stages $E_2$, $E_3$ and to amplifier C via weighting members or networks $A_1$, $A_2$, $A_3$ respectively (e.g., attenuators) which in effect establish desired relative amplitudes for the input signal as applied to each of the stages $E_1$, $E_2$, $E_3$ and the amplifier C. The output signal from the amplifier C is also utilized as a feedback signal and is coupled to the inputs of each of the stages $E_1$, $E_2$, $E_3$ via further weighting members $B_1$, $B_2$, $B_3$ respectively. The design of such filters to achieve a desired filter action is well known to those skilled in the art.

Figure 4B:
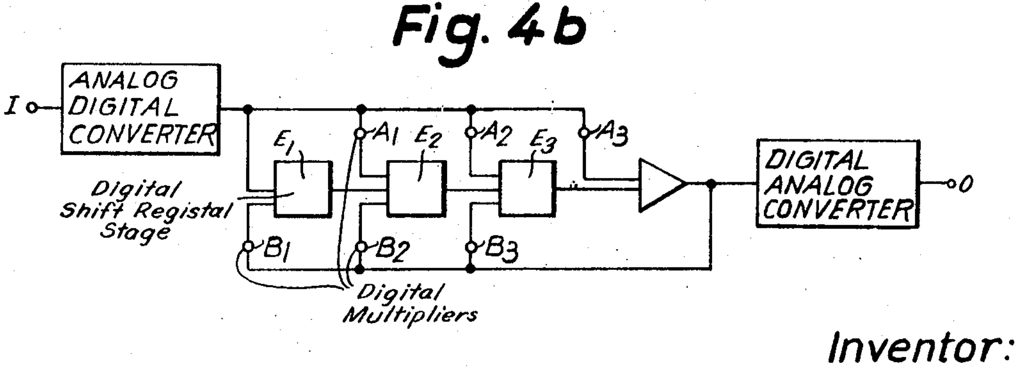

Instead of these sampled data filters it is also possible to use digital filters which are here understood to be feedback-connected digital shift registers. The fact that these digital filters can process only binary values requires appropriate analog-digital or digital-analog converters. Aside from this difference in construction, the operation is comparable to the described active filter types. The block diagram of a digital filter of the third order is the same as shown in FIG. 4*a* for a sampled data filter with weighting elements $A_1$–$A_3$ and $B_1$–$B_3$ being digital multipliers and shift register stages E1–E3 each being able to store an $m$-bit digital word ($m$ is the number of binary digits each data sample is converted to). The input of this filter is connected to to the output of an analog-digital converter and the output of the filter is connected to the input of a digital-analog converter (FIG. 4*b*).

At the receiving location, e.g., $TL_n$, the data is recovered from the transmitted pulse sequence. This is particularly easy with the already mentioned interpolator I which may be constructed, for example, as a holding member, i.e., which maintains the voltage value of a received pulse until the arrival of the next pulse, so that in the receiver there is formed a stepped reproduction of the envelope of the pulse sequence approximately as shown in FIG. 2*d*. Such a holding member is well known as sample-and-hold circuit (see, e.g., W. Kuntz, "A New Sample-and-Hold Device and Its Application to the Realization of Digital Filters," Proc. IEEE Vol. 56 (1968), 2092–2093).

Figure 3:
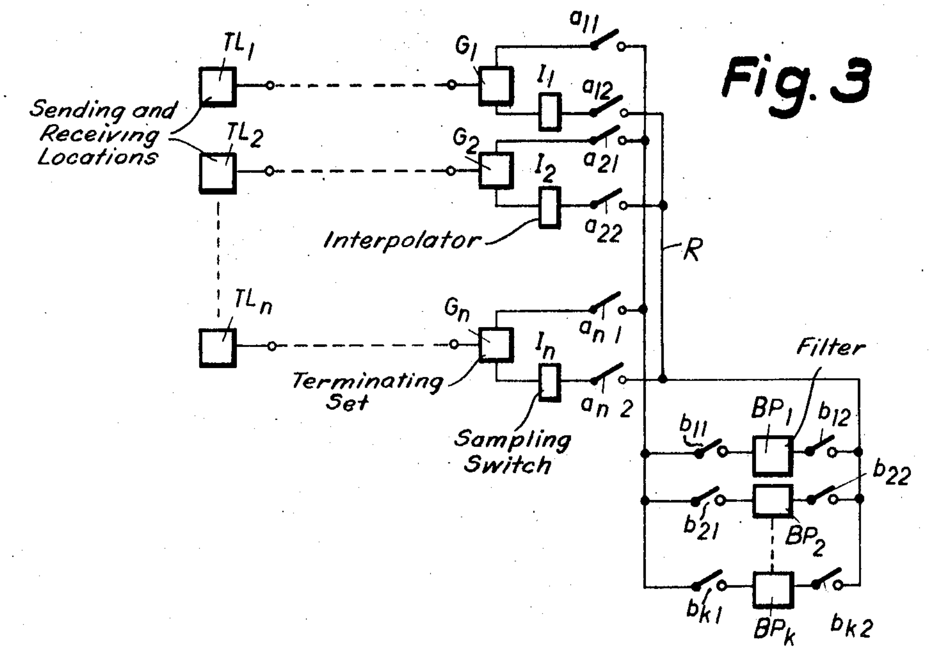
FIG. 3 is a schematic representation of an embodiment of a data transmission system according to the invention.

It should be noted that although the embodiment of FIG. 3 has been illustrated utilizing conventional terminating sets G for each of the locations, that such networks are in fact not required. That is, the networks G may be eliminated and a complete four-wire transmission between the respective parties provided.

According to a further advantageous embodiment of the invention further saving in costs may be attained by replacing the individual sampled data or digital filters of the embodiment of FIG. 3 with a single total filter which is operated in time multiplex. To make this possible, the filter is designed in a known manner so that pulses belonging to the same time slot are simultaneously present at all input and output coupling points so that the separation of the individual connections is assured. Time multiplexed filters of that kind have been proposed by L. B. Jackson, J. F. Kaiser and H. S. McDonald in a paper "An Approach to the Implementation of Digital Filters" (IEEE Transactions on Audio and Electroacoustics, Vol. AU–16 (1968), 3, 413–421).

The system according to the present invention can be connected in a very simple manner with an already available PCM system if, as explained above, a scanning frequency $f_p$ of 16 KHz is selected, since it is then possible to set the pulse frequency introduced for PCM nets by alternating pulse suppression.

It should finally be mentioned that the saving in filters realized with a system according to the present invention offers such a significant economic advantage that entirely new aspects may result for the application of pulse amplitude modulation systems.

It will be understood that the above description of the present invention is susceptible to various modifications, changes and adaptations, and the same are intended to be comprehended within the meaning and range of equivalents of the appended claims.

I claim:

1. In a data transmission system for transmitting data between at least two of a plurality of locations coupled to a single transmission means, wherein switches which are cyclically closed for short periods of time are provided for each of said locations for connecting said locations to said transmission means and to each other, and the data to be transmitted is scanned at a scanning frequency $f_p$ with respect to its amplitude and transmitted via said transmission means in time multiplex, the improvement comprising:

a. signal source means at said locations for generating the data to be transmitted in fundamental frequency bands, said signal sources having a source-limited bandwidth which is greater than $f_p/2$;

b. means for scanning the full bandwidth of the generated data; and c. bandpass filter means connected in said transmission means for filtering the scanned data to suppress periodically occurring frequency regions which contain distortions resulting from the overlapping of sidebands grouped about the multiples of the scanning frequency with adjacent sidebands or with the fundamental frequency band and for limiting the frequency bands to a wanted bandwidth.

2. A data transmission system as defined in claim 1 wherein the closing of said switches galvanically connects said locations to said transmission means and to each other.

3. A data transmission system as defined in claim 1 wherein said scanning frequency $f_p$ is equal to $f_n$+$f_g$ where $f_n$ is the frequency below which there is a data containing frequency range which is to be transmitted without distortion, and $f_g$ is a frequency within the bandwidth of said signal sources and greater than $f_n$ at which the power density of the generated data is negligibly small with respect to the power density of the portion of the generated data which is to be transmitted without distortion.

4. A data transmission system as defined in claim 3 wherein the data to be transmitted is the human voice.

5. A data transmission system as defined in claim 3 wherein said filter means suppresses the frequency region between $f_n$ and $f_g$.

6. A data transmission system as defined in claim 1 wherein said filter means comprises a plurality of active filters of the sampled data filter type.

7. A data transmission system as defined in claim 1 wherein said filter means comprises a plurality of active filters of the digital filter type.

8. A data transmission system as defined in claim 1 wherein the pulses representing the transmitted scanned data are received at each location via interpolating means for reconstructing the data from the pulses.

9. A data transmission system as defined in claim 8 wherein said interpolating means are holding circuits.

10. A data transmission system as defined in claim 1 wherein said filter means comprises a single total filter operated in time multiplex. next 11. A data transmission system as defined in claim 1 wherein said filter means comprises a plurality of bandpass filters and further switch means for selectively connecting one of said filters into said transmission means only during the period when the respective switches for the two of said locations which are connected together are closed.

12. A data transmission system as defined in claim 11 wherein the number of said filters is less than the number of said locations.

13. In a data transmission system for transmitting data between at least two of a plurality of locations coupled to a single transmission means, wherein switches which are cyclically closed for short periods of time are provided for each of said locations for connecting said locations to said transmission means and to each other, and the data to be transmitted is scanned at a scanning frequency $f_p$ with respect to its amplitude and transmitted via said transmission means in time multiplex, the improvement comprising:

signal source means at said locations for generating the data to be transmitted in fundamental frequency bands, said signal sources having a limited bandwidth which is greater than $f_p/2$;

means for scanning the full-bandwidth of the generated data;

filter means, comprising a plurality of bandpass or low pass filters, connected in said transmission means for filtering the scanned data to suppress the periodically occurring frequency regions which contain distortions resulting from the grouping of the said fundamental frequency bands about the multiples of the scanning frequency and for limiting the frequency bands to a wanted bandwidth; and further switch means for selectively connecting one of said filters into said transmission means only during the period when the respective switches for the two of said locations which are connected together are closed.

14. A data transmission system as defined in claim 13 wherein the number of said filters is less than the number of said locations.

15. In a data transmission system for transmitting data between at least two of a plurality of locations coupled to a single transmission means, wherein switches which are cyclically closed for short periods of time are provided for each of said locations for connecting said locations to said transmission means and to each other, and the data to be transmitted is scanned at a scanning frequency $f_p$ with respect to its amplitude and transmitted via said transmission means in time multiplex, the improvement comprising:

a. generating the data to be transmitted as fundamental frequency bands in signal sources having a source-limited bandwidth greater than one-half of the scanning frequency $f_p$, b. scanning the full bandwidth of said generated data, and c. filtering the scanned data being transmitted to suppress those periodically occurring frequency regions containing distortions resulting from the overlapping of sidebands grouped about the multiples of the scanning frequency with adjacent sidebands or with the fundamental frequency band and to limit the frequency bands to a wanted bandwidth.

* * * * *